United States Patent [19]

Hotomi et al.

[11] Patent Number: 4,971,880

[45] Date of Patent: Nov. 20, 1990

[54] DEVELOPER CONTAINING HALOGENATED AMORPHOUS CARBON PARTICLES PREPARED BY PLASMA-POLYMERIZATION

[75] Inventors: Hideo Hotomi; Izumi Osawa; Isao Doi; Masanori Fujiwara; Shuji Iino; Kenji Masaki, all of Osaka, Japan

[73] Assignee: Minolta Camera Kabushiki Kaisha, Osaka, Japan

[21] Appl. No.: 362,234

[22] Filed: Jun. 6, 1989

[30] Foreign Application Priority Data

Jun. 7, 1988 [JP] Japan ................................ 63-140756

[51] Int. Cl.[5] .......................... G03G 9/00; G03G 5/00; B05D 3/06; B32B 5/16

[52] U.S. Cl. ................................ 430/108; 430/106.6; 430/110; 430/137; 427/41; 428/403

[58] Field of Search ............ 430/108, 137, 110, 106.6; 427/41; 428/403

[56] References Cited

U.S. PATENT DOCUMENTS

| | | |
|---|---|---|
| Re. 31,072 | 11/1982 | Jadwin et al. . |
| 3,533,835 | 10/1970 | Hagenbach et al. . |
| 3,669,885 | 6/1972 | Wright et al. . |
| 3,720,617 | 3/1973 | Chatterji et al. . |
| 3,795,618 | 3/1974 | Kasper . |
| 3,840,464 | 10/1974 | Van Engeland et al. . |
| 3,873,356 | 3/1975 | Queener et al. . |
| 3,879,302 | 4/1975 | Reick et al. . |
| 3,898,170 | 8/1975 | Kasper . |
| 3,916,065 | 10/1975 | Moriconi et al. . |
| 4,013,573 | 3/1977 | Leikhim et al. . |
| 4,062,693 | 12/1977 | Berger . |
| 4,265,995 | 5/1981 | Mammino . |
| 4,493,855 | 1/1985 | Sachdev et al. . |
| 4,517,268 | 5/1985 | Gruber et al. . |
| 4,518,673 | 5/1985 | Noguchi et al. . |
| 4,555,466 | 11/1985 | Okada et al. . |
| 4,600,675 | 7/1986 | Iwasa et al. . |
| 4,609,603 | 9/1986 | Knapp et al. . |
| 4,672,016 | 6/1987 | Isoda et al. . |
| 4,824,753 | 4/1987 | Hotomi et al. ...................... 430/108 |
| 4,873,115 | 10/1989 | Matsumura et al. .................. 427/34 |

FOREIGN PATENT DOCUMENTS

| | | |
|---|---|---|
| 1158090 | 12/1983 | Canada . |
| 2725963 | 12/1977 | Fed. Rep. of Germany . |
| 55-28032 | 2/1980 | Japan . |
| 57-122449 | 7/1982 | Japan . |
| 57-190957 | 11/1982 | Japan . |
| 59-200262 | 2/1984 | Japan . |
| 59-37553 | 3/1984 | Japan . |
| 59-69762 | 4/1984 | Japan . |
| 59-201064 | 4/1984 | Japan . |
| 59-223458 | 12/1984 | Japan . |
| 60-73631 | 4/1985 | Japan . |
| 60-107038 | 6/1985 | Japan . |
| 60-147750 | 8/1985 | Japan . |
| 170865 | 9/1985 | Japan . |
| 60-50543 | 12/1985 | Japan . |
| 2083920 | 3/1982 | United Kingdom . |

*Primary Examiner*—Marion C. McCamish
*Assistant Examiner*—S. Crossan
*Attorney, Agent, or Firm*—Burns, Doane, Swecker & Mathis

[57] ABSTRACT

The present invention relates to a developer such as a toner and/or carrier for use in electrophotographic developing processes, and more specifically relates to a developer containing halogenated amorphous carbon particles prepared by plasma-polymerization, wherein the particles may take two forms, i.e., one with seed particles which is coated with the plasma-polymerized film containing at least carbon and halogen or the other without the seed particles which is formed by plasma-reacting carbon and halogen.

24 Claims, 3 Drawing Sheets

DEVELOPER CONTAINING HALOGENATED AMORPHOUS CARBON PARTICLES PREPARED BY PLASMA-POLYMERIZATION

FIELD OF THE INVENTION

The present invention relates to a developer such as a toner and/or carrier for use in electrophotograhic developing processes, and more specifically relates to a toner and/or carrier containing plasma-polymerized halogenated amorphous carbon particles.

BACKGROUND OF THE INVENTION

It is well known that toner and/or carrier particles used in electrophotographic developing processes are required to possess certain characteristics. In developing and transfer processes, the toner behaves as charged particles. In two-component developing materials, the charge is triboelectrically imparted to the toner by contact with the carrier, while in monocomponent developing materials, the charge is triboelectrically imparted to the toner through contact with a developing sleeve or other member of the developing device. That is, the toner and/or carrier must possess triboelectric charging properties. The toner and carrier particles function as a fluid when the toner is supplied to the developing device and residual toner is cleaned from the photosensitive member. The carrier functions to carry the toner to the developing region. Further, the toner and/or carrier particles must possess flow characteristics. In addition, the various aforesaid properties must be evident under a variety of environmental conditions, so that the toner and/or carrier must be resistant to environmental influences.

SUMMARY OF THE INVENTION

The present invention provides a developer which possesses excellent properties in regard to the previously described characteristics and requirements.

More specifically, a first object of the present invention is to provide a developer which possesses excellent triboelectric charging properties. That is, the developer of the present invention has superior charging properties and is not susceptible to producing white stripes or toner fogging even after long-term copier printing, and the invention provides a developer which has stable triboelectric charging characteristics to assure adequate image density.

A second object of the present invention is to provide a developer which produces excellent copy images under high temperature and high humidity environmental conditions.

A third object of the present invention is to provide a developer having reduced cohesiveness and improved flow characteristics, and which does not adhere to the photosensitive member.

The present invention provides a developer containing at least halogenated amorphous carbon particles prepared by plasma-polymerization to accomplish the aforesaid objects.

The amorphous carbon particles of the present invention can be produced by inducing a plasma reaction between a hydrocarbon gas and a material gas containing at least a halogen by means of a glow discharge so as to polymerize the produced radicals and ions, and coating the obtained particles with a plasma-polymerized film. Particles having at least a plasma-polymerized surface are also suitable.

The bonding of atoms in the product obtained through a plasma-polymerization process induced by a glow discharge includes a multiplicity of bond distances and bond angles which diverge markedly from those of the original atomic bonds.

Although the reason the developer containing amorphous carbon particles of the present invention possess such excellent triboelectric charging properties is believed to be related to the previously described irregular bonding, conclusive evidence is lacking at present. That is, the triboelectric chargeability is thought to be improved by the heightened chemically active state produced by the irregular bonding of the halogen atoms in the amorphous carbon particles. In illustration, the amorphous carbon particles of the present invention possess markedly different properties than do materials having a high number of regular bonds like, for example, teflon resins.

The reason for the resistance to environmental factors, in particular the reason consistent and stable copy images are produced under conditions of high temperature and high humidity, obtained by the inclusion of the amorphous carbon particles of the present invention is likewise unclear at present, although such resistance is thought to be derived from the increased the hydrophobic nature, reduced water absorptivity, and reduced electrical leakage arising from the incorporation of halogen atoms.

Further, the improved flow characteristics of the developer containing plasma-polymerized particles of the present invention is thought to be attributable to a marked shift to low surface energy by the surface of the particles containing halogen atoms.

BRIEF DESCRIPTION OF THE DRAWINGS

These and other objects or features of the present invention will become apparent from the following description of a preferred embodiment(s) thereof taken in conjunction with the accompanying drawings, in which.

DETAILED DESCRIPTION THE INVENTION

Figure 1:
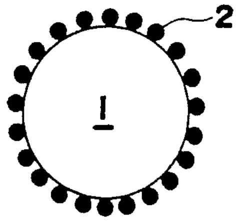
FIGS. 1 through 3 are brief illustrations showing examples of configurations of the developer carrier of the present invention.
Figure 2:
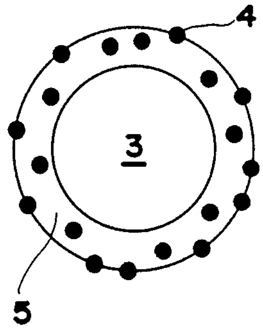
Figure 3:
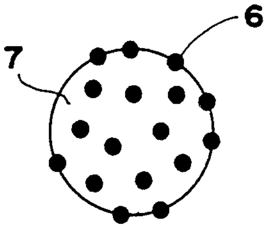

The developer according to the present invention which contains halogenated amorphous carbon particles (hereinafter referred to as a (plasma-polymerized particles) and which may be useful as toner or carrier for developing an electrostatic latent image may take various forms and configurations as shown in FIGS. 1–3.

FIG. 1 shows an example of a configuration of the developer of the invention, wherein the plasma-polymerized particles (2) are adhered to cover the entire surface of a core (1).

The developer shown in FIG. 1 is a so-called external-additive type.

Firstly explained is the developer of a this example when used as a carrier. In the case of carrier, the core (1) may be made of magnetic core particles such as magnetic material or a mixture of magnetic powder and binder resin. By this construction, the carrier is allowed to be used for a magnetic-brush developing method. The core (1) may be made of non-magnetic material such as resins to use the same as a non-magnetic carrier and the plasma-polymerized particles (2) are adhered to cover the entire surface of the core (1).

The plasma-polymerized particles of the invention are produced as particles by induced recombination of radicals or ions derived from a plasma reaction by glow discharge between material gas containing at least carbon and halogen.

Further, the plasma-polymerized particles of the invention may be produced as particles having a plasma-polymerized film derived from material gas containing at least carbon and halogen formed on the surface of suitable seed particles such as metal oxide particles, resin particles and pigment particles. The plasma-polymerized particles produced by the above-mentioned process have an amorphous structure containing at least carbon and halogen.

The carrier shown in FIG. 1 may be used as a toner by controlling the size.

Toner as well known must contain binder resin as a fixing composition because the toner must be fixed after developing an electrostatic latent image. For that reason, the core (1) is made of binder resin or a mixture comprising binder resin and magnetic powders. When the core (1) includes magnetic powders, it can be used as a monocomponent toner. The Plasma-polymerized particles (2) adhered over the core and which serves as a toner may be produced as particles by inducing recombination of radicals or ions, or having a plasma-polymerized film formed on the surface of suitable seed particles.

FIG. 2 shows a modified example of a configuration of the developer of the invention.

The figure shows a core (3) coated with an overcoat layer comprising binder resin (5) and the plasma-polymerized particles (4) dispersed in the binder resin (5). The developer shown in FIG. 2 is a so-called coated-type developer.

The developer of this example used as a carrier will be explained hereinafter.

The core (3) is substantially the same as the core (1) of FIG. 1. Namely, the core (3) may be made of magnetic material or a mixture of magnetic material and binder resin so as to be applied as a carrier for a magnetic-brush developing method or may be made of non-magnetic material such as resin. Further, the composition and structure of the plasma-polymerized particles (4) are the same as those explained in FIG. 1.

The surface of plasma-polymerized particles (4) must be formed to have an amorphous structure containing carbon and halogen with a plasma-polymerized reaction. Although the plasma-polymerized particles may take two forms, i.e., one with the seed such as metal oxide and resin which is coated with the plasma-polymerized film containing at least carbon and halogen or the other without the seed where the entire particle is formed by plasma-reacting carbon and halogen, either type may be used as both exhibit excellent characteristics.

Binder resin (5) constituting the overcoat layer is not limited specifically. However, binder resin (5) should preferably have polarity because binder resin (5) contributes to a triboelectrocharging between the carrier and toner.

To use the developer of FIG. 2 as a toner it is basically sufficient that the size be reduced to fit to use as a toner. That is the, core (3) is almost the same as the core (1) shown in FIG. 1 and the core (3) includes binder resin as a fixing composition and may include magnetic powders when used as a monocomponent toner. And further, binder resin (5) and plasma-polymerized particles (4) of a toner are common to those of a carrier.

FIG. 3 shows another configuration of a developer for the present invention, wherein the plasma-polymerized particles (6) are uniformly dispersed in the binder resin (7). This configuration is a so-called binder-type developer.

When this configuration is applied to a carrier for use in a magnetic-brush developing method, suitable magnetic powders are further dispersed into the binder resin (7). Plasma-polymerized particles (6) are produced by the same manner as that of FIG. 1 or FIG. 2.

When this developer is applied to a toner, the dispersion of magnetic powders into binder resin (7) is nor( essential as described in FIG. 1 or FIG. 2.

The typical construction of the developer according to the present invention has been explained above. However, when these developers are actually used, it is desirable to set several conditions within a specific range. These specific conditions will be explained hereinbelow.

With reference to the developer shown in FIG. 1, a mean particle size of the developer should be decided in accordance with the desired functionality of the toner or carrier. If the developer is used as a carrier, a mean particle size of the core (1) is about 20 to 90 μm, preferably about 30 to 60 μm. If the developer is used as a toner, a mean particle size of about 4 to 20 μm is preferable.

The plasma-polymerized particle (2) contains halogen in amount of more than 2 atomic %. When the amount of halogen is less than 2 atomic %, desirable triboelectrical property cannot be obtained. Although there is no upper limitation on the amount of halogen atoms, the amount is necessarily restricted from the manufacturing process.

On the other hand, the plasma-polymerized particles preferably have a resistance of $9.9\times10^9$ (Ω.cm) or less. The resistance can be controlled by the use of doping metal atoms or the like.

The plasma-polymerized particles preferably include hydrogen in an amount of about 10 to 60 atomic %, thereby improving triboelectrical property. Further, the plasma-polymerized particles are formed to have a suitable mean particle size of about 0.005–0.50 μm, preferably 0.01–0.30 μm, more preferably 0.02–0.10 μm in order to effectively improve the charging properties. However, when the plasma-polymerized particles have seed particles, a suitable mean particle, size is about 0.05–0.50 μm preferably 0.10–0.30 μm from the perspective of production.

The content of the plasma-polymerized particles in the developer depends on whether the developer is used as a carrier or toner.

Namely, in the case of a carrier, triboelectrical characteristics are the most important factors for the carrier, while for a toner, fixing characteristics are important factors as well as triboelectrical characteristics. Because of these reasons, in the case of a carrier, plasma-polymerized particles (2) are formed on the core (1) in an amount of about 1 to 10 parts by weight based on the amount of 100 parts by weight of the core (1). In the case of toner, a preferable amount of the plasma-polymerized particles is about 0.01–0.20 parts by weight based on the amount of 100 parts by weight of core (1).

The core (1) may incorporate other materials such as colorants and/or charge control agents.

The above-mentioned developer shown in FIG. 1 is able to be used by combining any kind of carrier or toner. For example, the carrier of FIG. 1 is able to be used in combination with a styrene-acrylic type toner.

With reference to the developer shown in FIG. 2 or FIG. 3, a suitable mean particle size thereof should be decided in accordance with the desired functionality of the toner or carrier as has been explained in connection with FIG. 1. Generally, in the case of applying the developer of the present invention to the carrier, the size is preferably about 20–90 μm and in case of applying to a toner, the size is preferably about 4–20 μm.

Further, the content amount of plasma-polymerized particles in the developer should be decided in accordance, with the desired charging characteristics. For example, in the case of a developer shown in FIG. 3, when applying to a carrier, the plasma-polymerized particles (6) about 1–10 parts by weight is desirably incorporated in amount based on 100 parts by weight of the binder resin (7). The amount of the plasma-polymerized particles (6) is desirably about 0.5–3 parts by weight based on 100 parts by weight of the binder resin (7) when these particles (6) are applied to a toner.

As described earlier, the developer shown in FIGS. 1–3 can be used as a carrier or toner, however, this developer should be formed to have a resistance of about $10^7$–$10^{14}$ (Ω.cm) from a perspective of an electrophotographic developing method.

The following is a detailed description of the plasma-polymerized particles of the present invention. The developer of the present invention is characterized by the plasma-polymerized particles included therein with various forms as shown in FIGS. 1–3. The plasma-polymerized particles are produced by a known plasma-polymerized method such as a glow discharge method or CVD method.

Figure 4:
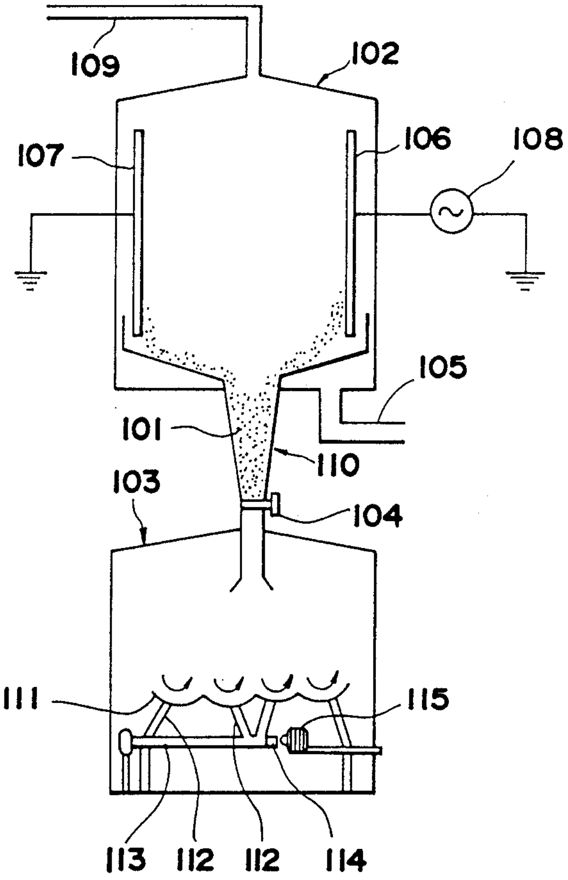
FIGS. 4 through 7 are illustrations of apparatus for producing the plasma-polymerized particles of the present invention.
Figure 5:
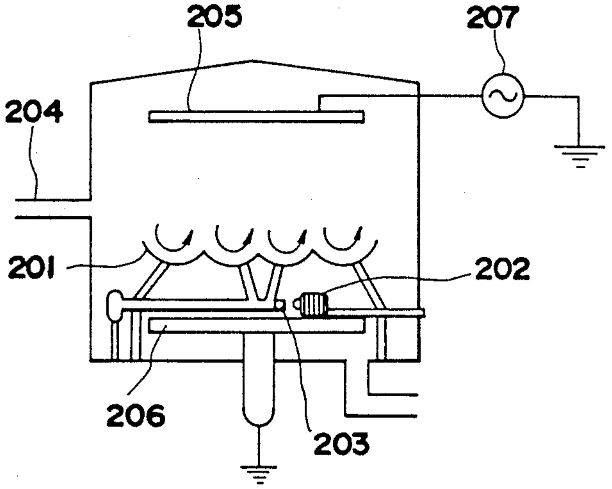

FIGS. 4–7 show production apparatuses for producing the plasma-polymerized particles of the present invention. Apparatus 1 and 2 which respectively correspond to FIG. 4 and FIG. 5 are for producing plasma-polymerized particles without seed particles, whereas apparatuses 3 and 4 shown in FIG. 6 and FIG. 7 respectively are for producing the plasma-polymerized particles having seed particles.

Apparatus 1

The production apparatus shown in FIG. 4 comprises a reactor 102 for forming the plasma-polymerized particles of the present invention and a recovery chamber 103 for recovering and preventing agglomeration of the produced plasma-polymerized particles 101. The reactor 102 and recovery chamber 103 are separated by a closable gate valve 104 provided therebetween. A vacuum exhaust port 105 for regulating the pressure in the reactor is provided below the reactor 102. The reactor 102 is internally provided with two mutually parallel plate-shaped electrodes 106 and 107, the electrode 106 being connected to a variable frequency power source 108 while electrode 107 is grounded. The source gases (i.e., hydrocarbon gas and halogen gas) for the plasma-polymerized particles 101 are introduced to the reactor 102 through gas feed pipe 109 using $H_2$, He, Ar or the like as the carrier gas, and dissociated by a glow discharge initiated across the two electrodes 106 and 107, thereby inducing a plasma or ionic state to form the plasma-polymerized particles 101. A collecting section 110 is provided beneath reactor 102 to collect all plasma-polymerized particles 101 formed between electrodes 106 and 107, the bottom of the collecting section 110 being connected to recovery chamber 103 by means of a gate valve 104.

Plasma-polymerized particles 101 formed within reactor 102 are deposited on a electrically conductive, concave-shaped powder pan 111 which is provided within the recovery 103 by opening the aforesaid gate valve 104. Powder, pan 111 is supported by support 112, and a portion of the support 112 is connected to an oscillating member 113. A permanent magnet 114 is disposed at one end of the oscillating member 113 with an electromagnet 115 being opposed thereto and connected to alternating current AC power source. Powder pan 111, which is connected to the aforesaid permanent magnet 114 and electromagnet 115 through the oscillating member 113, is oscillated by means of the action of the permanent magnet 114 and electromagnet 115 when the plasma-polymerized particles 101 are being deposited so as to circulate the plasma-polymerized particles 101 by convection and thereby prevent agglomeration of the particles.

In the apparatus of the aforesaid construction, the reactor 102 is first evacuated using the vacuum exhaust port 105 to create a vacuum of about 10-6 torr, and a glow discharge is initiated across electrodes 106 and 107 to induce a polymerization reaction of the material gases introduced therein through a first pipe 109, thereby producing the plasma-polymerized particles 101.

Power supplied to electrode 106 is normally 10 to 1,000 watts; the frequency may be 10 kHz to 50 MHz, and is preferably 10 kHz to 30 MHz.

Apparatus 2

The production apparatus shown in FIG. 5 is also an apparatus for producing plasma-polymerized particles without using seed particles. A concave powder pan 201 is oscillated by a vibrator through the action of an electromagnet 202 and a permanent magnet 203. Material gases fed from a pipe, 204 are plasma-polymerized between electrodes 205 and 206 to produce plasma-polymerized particles of the present invention on pan 201. In this apparatus, a variable-frequency power source 207 is connected to electrode 205 to generate a plasma reaction between the electrodes 205 and 206. Power applied to electrode 205 is normally 10 to 1,000 watts, and the frequency is 10 kHz to 50 MHz.

Apparatus 3

Figure 6:
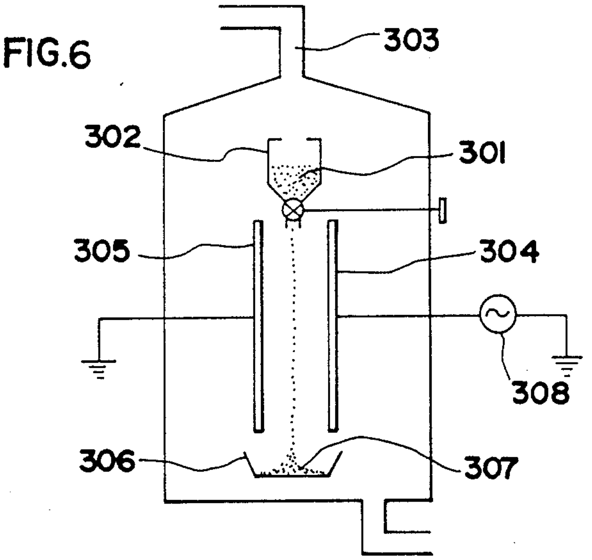

The production apparatus shown in FIG. 6 is constructed so as to downwardly dispense small quantities of seed particles 301 from a hopper 302 while feeding material gases through a pipe 303, and initiate a plasma reaction between horizontally disposed electrode panels 304 and 305 so as to produce plasma-polymerized particles 307 on pan 306. In the present apparatus, a variable frequency power source 308 is connected to electrode 304 to initiate the plasma reaction between the electrodes 304 and 305. The power applied to electrode 304 is 10 to 1,000 watts with a frequency of 10 kHz to 50 MHz.

Apparatus 4

Figure 7:
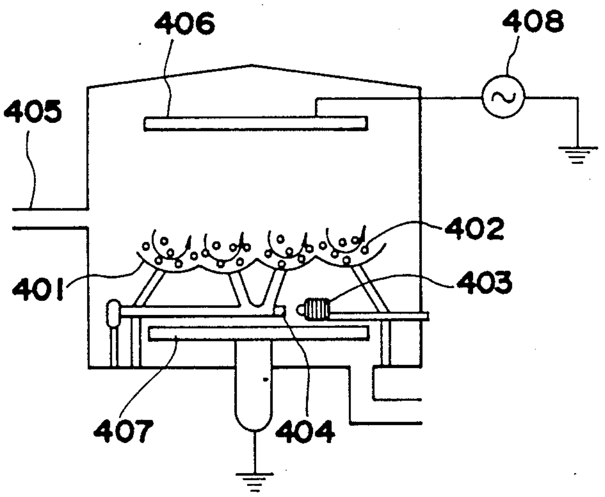

The production apparatus shown in FIG. 7 is constructed so as to supply seed particles 402 onto a concave powder pan 401 and oscillate the pan 401 by means of a vibrator comprising an electromagnet 403 and permanent magnet 404 while feeding material gases through a pipe 405, and initiate a plasma reaction between electrodes 406 and 407 so as to produce a plasma-polymerized film coating on the seed particles. A variable frequency power source 408, which is connected to electrode 406, outputs 10 to 1,000 watt power at a frequency of 10 kHz to 10 MHz.

In the apparatus of the present construction, the coating of the seed particles can be made more effective by increasing the circulation of the powder through convection which is generated when the seed particles 402 are moved vertically and horizontally in coincidence with a fixed number of oscillations of pan 401.

Subsequently, the material gases of plasma-polymerized particles of the present invention are listed below. Generally, hydrocarbon gas and halogenated compound gas are used for the material gases.

A variety of hydrocarbons may be used, and useful compounds are not specifically limited to those listed below. Useful saturated hydrocarbons are, for example, methane, ethane, propane, butane, hexane, heptane, octane, isobutane, isopentane, neopentane, isohexane, neohexane, dimethylbutane, methylhexane, ethylpentane, dimethylpentane, tributane, methylheptane, dimethylhexane, trimethylpentane, isonanone and the like. Useful unsaturated hydrocarbons are, for example, ethylene, propylene, isobutylene, butylene, butene, pentene, methylbutene, hexene, tetramethylethylene, heptene, octene, allene, methylallene, butadiene, pentadiene, hexadiene, cyclopentadiene, ocimene, allocimene, myrcenr, hexatriene, acetylene, diacetylene, methylacetylene, butene, pentene, hexene, heptene, octene and the like. Useful alicyclic hydrocarbons are, for example, cyclopropane, cyclobutane, cyclopentane, cyclohexane, cycloheptane, cyclooctane, cyclopropene, cyclobutene, cycloheptene, cyclohexene, cycloheptene, cyclooctene, limonene, terpinolene, phellandrene, sylvestrene, thujene, carene, pinene, bornylene, camphene, fentene, cyclofentene, tricyclene, bisabolene, zingiberene, curcurmene, humulene, cadinene sequibenihene, selinene, caryophyllene, santalene, cedrene, camphorene, phyllocladene, podocarprene, mirene and the like. Examples of useful aromatic hydrocarbons are benzene, toluene, xylene, hemimellitene, pseudocumene, mesitylene, prehnitene, isodurene, durene, pentamethylbenzene, hexamethylbenzene, ethylbenzene, propylbenzene, cumene, styrene, biphenyl, terphenyl, diphenylmethane, triphenylmethane, dibenzyl, stilbene, indene, naphthalene, tetralin, anthracene, phenanthrene and the like.

Gases of halogenated compounds may be used in the present invention in addition to hydrocarbon gases to incorporate halogens within the plasma-polymerized particles. Useful halogens are fluorine, chlorine, bromine and iodine. These halogenated compounds need not always be in a gaseous phase at room temperature and atmospheric pressure, but can be in a liquid or solid phase insofar as they can be vaporized by melting, evaporation or sublimation, for example, by heating or in a vacuum. A variety of organic compounds are useable as the halogenated compound. Halogens such as fluorine, chlorine, bromine and iodine are useable in this invention, and examples of useful halogen compounds are inorganic compounds such as hydrogen fluoride, chlorine fluoride, bromine fluoride, iodine fluoride, hydrogen chloride, bromine chloride, iodine chloride, hydrogen bromide, iodine bromide, hydrogen iodide and the like; and organic compounds such as alkyl halides, alkyl-metal halides, allyl halides, halogenated silicic esters, styrene halides, polymethylene halides, halogen substituted organosilanes, haloform, and the like.

Examples of useful alkyl halides are methyl fluoride, methyl chloride, methyl bromide, methyl iodide, ethyl fluoride, ethyl chloride, ethyl bromide, ethyl iodide, propyl fluoride, propyl chloride, propyl bromide, propyl iodide, butyl fluoride, butyl chloride, butyl bromide, butyl iodide, amyl fluoride, amyl chloride, amyl bromide, amyl iodide, hexyl fluoride, hexyl chloride, hexyl bromide, hexyl iodide, heptyl fluoride, heptyl chloride, heptyl bromide, heptyl iodide, and the like. Examples of useful alkyl-metal halides are dimethylaluminum chloride, dimethylaluminum bromide, diethylaluminum chloride, diethylaluminum iodide, methylaluminum dichloride, methylaluminum dibromide, ethylaluminum diiodide, trimethyltin chloride, trimethyltin bromide, trimethyltin iodide, triethyltin chloride, triethyltin bromide, dimethyltin dichloride, dimethyltin dibromide, dimethyltin diiodide, diethyltin dichloride, diethyltin dibromide, diethyltin diiodide, methyltin trichloride, methyltin trichloride, methyltin triiodide, ethyltin tribromide and the like. Examples of useful allyl halides are fluorobenzene, chlorobenzene, bromobenzene, iodobenzene, chlorotoluene, bromotoluene, chloronaphthalene, bromonaphthalene, etc.; examples of halogenated silicic esters are monomethoxytrichlorosilane, dimethoxydichlorosilane, trimethoxymonochlorosilane, monoethoxytrichlorosilane, diethoxydichlorosilane, triethoxymonochlorosilanc, monoallyloxytrichlorosilane, diallyloxydichlorosilane, triallyloxymonochlorosilane,, etc.; examples of styrene halides are chlorostyrene, bromostyrene, iodostyrene, fluorostyrene, and the like. Useful examples of polymethylene halides are methylene chloride, methylene bromide, methylene iodide, ethylene chloride, ethylene bromide, ethylene iodide, trimethylene chloride, trimethylene bromide, trimethylene iodide, dichlorobutane, dibromobutane, diiodobutane, dichloropentane, dibromopentane, diiodopentane, dichlorohexane, dibromohexane, diiodohexane, dichloroheptane, dibromoheptane, diiodoheptane, dichlrooctane, dibromooctane, diiodooctane, dichlorononane, dibromononane, and the like. Examples of useful halogen substituted organosilanes are chloromethyltrimethylsilane, dichloromethyltrimethylsilane, bis(chloromethyl)dimethylsilane, tris(-chloromethyl)methylsilane, chloroethyltriethylsilane, dichloroethyltriethylsilane, bromomethyltrimethylsilane, iodomethyltrimethylsilane, bis(iodomethyl)dimethylsilane, chlorophenyltrimethylsilane, bromophenyltrimethylsilane, chlorophenyltriethylsilane, bromophenyltriethylsilane, iodophenyltriethylsilane, etc.; examples of haloforms are fluoroform, chloroform, bromoform, iodoform, and the like.

Since it is preferable that the plasma-polymerized particles of the present invention contain the greatest quantity of halogen atoms possible, all of the hydrogen atoms in the previously described halogenated carbon compounds are preferably substituted by the halogen atoms contributed by organic compounds such as alkane halides, alkyl-metal halides, allyl halides, styrene halides, alkene halides, halogen substituted organosilanes, and the like. Fluoride compound gases which have a high degree of electronegativity are particularly suitable for use as a material gas in the formation of plasma-polymerized particles.

The volume resistivity value of the plasma-polymerized particles of the present invention can be regulated by vaporizing organometallic compounds or organometallic complexes of the groups of material gases described hereinafter, so as to induce the material gases of the present invention to pass through a plasma state for indirect doping.

Examples of the aforesaid useful organo-metallic compounds are:

Al: $Al(Oi—C_3H_7)_3$, $(CH_3)_3Al$, $(C_2H_5)_3Al$, $(i—C_4H_8Al$, $AlCl_3$

Fe: $Fe(Oi—C_3H_7)_3$, $(C_2H_5(_2Fe$, $Fe(CO)_5$

Ga: $Ga(Oi—C_3H_7)_3$, $(CH_3)_3Ga$, $(C_2H_5)_3GA$, $CaCl_3$, $GaBr_3$

Ge: $GeH_4$, $CeCl_4$, $Ce(OC_2H_5)_4$, $Ge(C_2H_4)_4$

Hf: $Hf(Oi—C_3H_7)_4$

In: $In(Oi—C_3H_7)_3$, $(C_2H_5)_3In$

La: $La(Oi—C_3H_7)_4$

Nb: $Nb(OC_2H_5)_5$

Sb: $Sb(OC_2H_5)_3$, $SbCl_3$, $SbH_3$

Ti: $Ti(Oi—C_3H_7)_4$, $Ti(OC_4H_9)_4$, $TiCl_4$

Ta: $Ta(OC_2H_5(_5$

V: $VO(OC_2H_5)_3$, $VO(OtC_4H_9)_3$

Y: $Y(Oi—C_3H_7)_3$

Zn: $Zn(OC_2H_5)_2$, $(CH_3)_2Zn$, $(C_2H_5)_2Zn$

Zr: $Zr(Oi—C_{23}H_7)_4$

Sn: $(CH_3)_4Sn$, $(C_2H_5)_4Sn$, $SnCl_4$

Cd: $(CH_3)_2Cd$

Co: $Co_2(CO)_5$

Cr: $Cr(CO)_6$

Mn: $Mn_2(CO)_{10}$

Mo: $Mo(CO)_6$, $MoF_6$, $MoCl_6$

W: $Wo(CO)_6$, $WCl_6$, $WF_6$ and the like, or any vinyl-metal monomers containing the aforesaid metals.

In addition to organometallic chelates, phthalocyanines and copper II acetyl acetonate may also be used as the organometallic complexes.

Useful phthalocyanine compounds are metallic phthalocyanines, monochloroaluminum monochlorophthalocyanine and the like having, for example, the following general structural formula [1]:

[1]

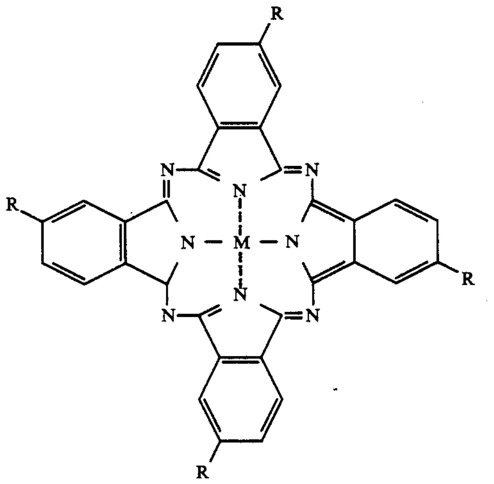

[where, in the structural formula, M represents Cu(II), Ni(II), Zn(II) or Mg(II), and R represents H, $OC_3H_7$, or $OC_5H_{11}$.]

Preferred compounds for regulating the volume resistivity of the plasma-polymerized particles of the present invention are metallic phthalocyanines, monochloroaluminum monochlorophthalocyanine, or copper (II) acetyl acetonate having the general structure shown in formula [1] above, and ideal compounds are monochloroaluminum monochlorophthalocyanine and copper (II) acetyl acetonate.

When the plasma-polymerized particles of the present invention are formed by coating a suitable seed particle with a plasma-polymerized film, suitable materials for use as the seed particles are metallic oxides, pigments, fluidized material, offset inhibitors, magnetic material or like particles.

Seed particle selection entails selection of a metallic oxide, pigment, magnetic material or like particle as the seed particle when functionality as a carrier is desirable, or selection of a metallic oxide, pigment, fluidized material, offset inhibitor, magnetic material or like particles when functionality as a toner is desirable. However, seed particle selection need not be limited to selection from among the aforesaid materials, but may include other suitable materials depending on the developer properties which are desired.

Examples of useful.metallic oxide particles are $SiO_2$, $Al_2O_3$, $TiO_2$, $Fe_2O_3$, ZnO, $CaCO_3$, $MgCO_3$, $MgSO_4$, and the like, while use of ferrites such as $Fe_2O_3$ and $Fe_3O_4$ and the like is preferred when ferromagnetic properties are desired for the developer.

Examples of useful pigments for the seed particle are described hereinafter by color. (Included are materials which duplicate those described for metallic oxides.)

Black: carbon black, acetylene black, lamp black, aniline black, etc.;

Red: red oxide, cadmium red, red lead, mercury thiocyanate, cadmium, permanent red 4R, lithol red, pyrazolone red, Watchung red, calcium salts, lake red, brilliant carmine 6B, eosin lake, rhodamine lake B, alizarin lake, brilliant carmine 3B, and the like;

Green: chrome green, chrome oxide, pigment green B, malachite green lake, and the like;

Blue: Prussian blue, cobalt blue, alkali blue lake, Victoria blue lake, phthalocyanine blue, metal-free phthalocyanine blue, partially chlorinated phthalocyanine blue, fast sky blue, and the like;

White: zinc white, titanium oxide, antimony white, zinc sulfide, and the like;

Yellow: chrome yellow, zinc yellow, cadmium yellow, yellow oxide, mineral fast yellow, nickel-titanium yellow, naphthol yellow S, Hansa yellow G, Hansa yellow 10G, benzidine yellow G, benzidine yellow GR, quinoline yellow lake, permanent yellow, NCG and the like;

Orange: chrome orange, molybdate orange, permanent orange GTR, pyrazolone orange, vulcan orange, brilliant orange RK, benzidine orange G, brilliant orange GK, and the like.

Examples of fluidized particles are metallic oxide complexes, silica, silica-aluminum oxide mixture, silica-titanium oxide mixture, and the like.

Examples of offset inhibitors are resins, low-molecular weight polypropylene, polyethylene, or waxes, polypropylene oxides, polyethylene and the like.

Use of magnetic materials as seed particles is preferred when the functionality of a magnetic carrier or magnetic toner is desired, examples of such magnetic particles partially duplicating the metallic oxides, but including ferromagnetic metals such as cobalt, nickel and irons such as ferrite and magnetite, and most conspicuously alloys thereof, or compounds incorporating said elements, or ferromagnetic alloys produced by suitable heat processing but which do not contain ferromagnetic elements, examples of such alloys being so-called Heusler's alloys containing manganese and copper, e.g., manganese-copper-aluminum, manganese-copper-tin and the like, or chrome dioxide, etc.

Explained next are elements used to form the developer other than the plasma-polymerized particles which have been described. When the developer shown in FIG. 1 is used as a carrier, examples of magnetic materials which can be used as the core (1) are iron, nickel, cobalt and like metals and mixtures of these metals and zinc, metals such as antimony, aluminum, lead, tin, bismuth, beryllium, manganese, selenium, tungsten, zirconium, vanadium and alloys or mixtures thereof, metallic oxides such as iron oxide, titanium oxide, magnesium oxide and the like, nitrides such as chrome nitride, vanadium nitride and the like, carbides such as silicon carbide, tungsten carbide, etc., and mixtures of the aforesaid as well as ferrites and mixtures thereof.

When the core (1) is made of the mixture of magnetic powders and binder resin, examples of useful binder resins are thermoplastic resins, thermoset resins, photoset resins, the like. More specifically, examples of useful resins include thermosetting resins such as polyester resins, polyamide resins, polybutadiene, acrylic resins, ethylene-vinyl acetate copolymers, ion-exchange olefin copolymers, styrene-butadiene block copolymers, polycarbonates, polyvinyl chloride-acetate copolymers, cellulose esters, polyamides, etc.; examples of thermosetting resins are epoxy resins, urethane resins, silicone resins, phenolic resins, melamine resins, xylene resins, alkyd resins, thermoset acrylic resins, etc.; examples of useful photoset resins are poly-N-vinyl carbazole, polyvinylpyrene, polyvinylanthracene, etc. Preferred resins include silicone resins, acrylic resins, melamine resins, polycarbonate resins, polybutadiene, epoxy and the like.

The size of the magnetic materials dispersed is preferably about 2 μm or less, and more particularly 1 μm or less.

As to the binder resin (5) constituting the overcoat layer of the developer shown in FIG. 2, it should preferably have a polarity from a perspective of the triboelectrical property and examples of such resins are acrylic resins with polar radicals such as carboxyl, hydroxyl, glycidyl, amino and like groups, for example, acrylic acid monomers such as methacrylic acid, acrylic acid, maleic acid, itaconic acid, etc.; monomers having hydroxyl radicals such as hydroxypolypropylenemonometacrylate, polyethyleneglycolmonomethacrylate, and the like; monomers having amino radicals such as dimethylaminoethylmethacrylate and the like; lower alkyl ester acrylates and/or styrene and copolymers thereof such as glycidly methacrylate and the like, other usable resins include rosin-transformed phenolformalin-vinyl resin, cellulose resin, polyether resin, epoxy resin, silicone resin, fluorine resin and the like.

Further, the developer of the invention preferably has a resistance of $10^2$–$10^{16}$ (Ω.cm) as mentioned earlier. The resistance of developer of FIG. 3 can be controlled by mixing a water soluble resin or an oil soluble resin having an amino compound to the binder resin (7).

Examples of water soluble resins are natural resins such as gelatin, casein, glue, etc., and synthetic resins such as polyvinyl alcohol, polyvinyl methyl ether, ethylene-acrylate copolymer resins and the like. Useful oil soluble resins are, for example, cured urethane resin, epoxy resin, polyester resin, melamine acrylate resin and the like. Examples of amine compound are, for example, diethanolamine, dimethylethanolamine, triethanolamine, triisopropanolamine and the like. The quantity of these amine compound additives may usually be from 0.5 to 6% by weight.

Finally, the specific manner for producing the aforesaid developer as illustrated in FIG. 1–3 are explained hereinafter, but the present invention is not limited to these manners.

The external-additive type developer as illustrated in FIG. 1 is produced by a known mixing method. Namely, the developer is produced by mixing the core (1) and the plasma-polymerized particles (2) by a suitable mixing machine such as a Henshel mixer. Accordingly, the plasma-polymerized particles (2) are attracted to the surface of core (1) by Van der Waals force or electrostatic force and then are adhered completely to the core (1) by mechanical impact force and heat.

The coated-type developer as illustrated in FIG. 2 is produced by a known application method such as a spray application method, wherein the core (5) is sprayed with an application fluid comprising the binder resin (5) and the plasma-polymerized particles (4).

The binder-type developer as illustrated in FIG. 3 may be produced by a known classifying method. A classifying method comprises a step of mixing the plasma-polymerized particles (6) and the binder resin (7) into a ball mill or Hensher mixer, a step of kneading aforesaid materials and a step of classifying the kneaded materials after cooling.

Plasma-polymerized Particles A to D

Plasma-polymerized particles A through D of the present invention were produced using the aforesaid apparatus 1 through 4 and material gases under the plasma polymerization conditions described in Tables 1*a* and 1*b*. The average size of the obtained plasma-polymerization particles and their composition and volume resistivity as determined by Auger electron spectroscopy are shown in Table 1*b*.

EXAMPLE 1

| | |
|---|---|
| Styrene-acrylic copolymer resin, Haimaa SBM73 (Sanyo Chemical Industries, Ltd.) | 100 parts |
| RB-BL (Titan Kogyo K.K.): Magnetic powder mean particle size 0.5 to 0.6 μm | 200 parts |
| Carbon black, MA#8 (Mitsubishi Chemical Industries) | 4 parts |
| Plasma-polymerized particle D | 1 part |
| | (parts by weight) |

Material of the above composition was mixed in a ball mill for 20 min and formed into three adequately mixed rolls, refrigerated, coarsely pulverized to particles 5 mm and smaller using a feather mill, and classified to produce a binder-type carrier.

The obtained carrier had a mean particle size of 37 μm and volume resistivity of $5\times10^{13}$ Ω.cm.

EXAMPLE 2

A binder-type carrier of the present invention was produced in substantially the same manner as in Example 1, with the exception that plasma-polymerized particle B was substituted for plasma-polymerized particle D at a rate of 8.4 parts by weight.

The mean size of the binder-type carrier particles was 84 μm, and volume resistivity was $3\times10^9$ Ω.cm.

EXAMPLE 3

| (Application fluid) | |
|---|---|
| P-bis(diethylamino)tetraphenylbutadiene | 1 part |
| Polycarbonate | 1 part |
| Tetrahydrofuran | 20 parts |
| Plasma-polymerized particle A | 0.5 parts |

The above constituent materials were adequately mixed by stirring to produce an application fluid.

| (Core material) | |
|---|---|
| Thermoplastic polyester resin (softening point 123° C.; Tg 65° C.) | 100 parts |
| Magnetic powder, EPT-1000 (Toda Kogyo K.K.) | 500 parts |
| Carbon black, MA#8 (Mitsubishi Chemical Industries) | 2 parts |

The above constituent materials were well mixed in a Henschel mixer, kneaded, pulverized after refrigeration, and finally classified after being finely powdered in a jet pulverizer to produce core material having a mean particle size of 41 μm.

The thus obtained core material was sprayed at a rate of 3,000 parts by weight in the aforesaid application fluid using a SPIRACOTA SP-40 (Okada Seiko K.K.) for 120 min at a spray pressure of 3.5 kg/cm, spray rate of 40 g/min and temperature of 50° C. The obtained particles were then sieved to eliminate agglomerate particles, thereby producing a coated-type carrier. Mean particle size of the obtained carrier was 49 μm, and volume resistivity was $6\times10^{12}$ Ω.cm.

EXAMPLE 4

| (Core material) | |
|---|---|
| Thermoplastic polyester resin (softening point 123° C.; Tg 65° C.) | 100 parts |
| Magnetic powder, EPT-1000 (Toda Kogyo K.K.) | 500 parts |
| Carbon black, MA#8 (Mitsubishi Chemical Industries) | 2 parts |

The above constituent materials were well mixed in a Henschel mixer, kneaded, pulverized after refrigeration, and finally classified after being finely powdered in a jet pulverizer to produce core material having a mean particle size of 41 μm.

| | |
|---|---|
| Thermoplastic polyester resin (softening point 123° C.; Tg 65° C.) | 100 parts |
| Magnetic powder, EPT-1000 (Toda Kogyo K.K.) | 500 parts |
| Carbon black, MA#8 (Mitsubishi Chemical Industries) | 2 parts |

The above constituent materials were well mixed in a Henschel mixer, kneaded, pulverized after refrigeration, and finally classified after being finely powdered in a jet pulverizer to produce core material having a mean particle size of 55 μm.

Plasma-polymerized particles C were externally added to the surface of the aforesaid core material at a ratio of 3.4 parts to 100 parts by weight respectively by adequately mixing same with a Henschel mixer, thereby producing an external-additive type carrier. The obtained carrier had a volume resistivity of $8\times10^{13}$ Ω.cm.

EXAMPLE 5

| | |
|---|---|
| Thermoplastic polyester resin (softening point 122° C.; Tg 67° C.) | 100 parts |
| Carbon black, MA#100 (Mitsubishi Chemical Industries) | 5 parts |
| Offset inhibitor low molecular weight polypropylene (Sanyo Chemicals) | 5 parts |
| Spiron black TRH (chlorinated metal complex; Hodogaya Chemical Co., Ltd.) | 2 parts |
| Plasma-polymerized particle E | 2.4 parts |

The above constituent materials were well mixed in a Henschel mixer, kneaded, pulverized after refrigeration, and finally classified after being finely powdered in a jet pulverizer to produce a binder-type toner.

Size of the obtained toner ranged from 4 to 20 μm, the mean particle size being 11 μm, and volume resistivity of $4\times10^{14}$ Ω.cm.

EXAMPLE 6

A binder-type toner of the present invention was produced in substantially the same manner as in Example 5, with the exception that plasma-polymerized particle B was substituted for plasma-polymerized particle E at a rate of 0.8 parts by weight.

The mean size of the obtained particles was 5.5 μm, and volume resistivity was $9\times10^{15}$ Ω.cm.

EXAMPLE 7

| (Application fluid) | |
|---|---|
| Acrylic melamine thermoset resin | 10 parts |
| Ethylene-acrylate copolymer resin | 3 parts |
| Xylene | 125 parts |
| Plasma-polymerized particle C | 4.2 parts |

The aforesaid constituent materials were adequately mixed by stirring to produce an application fluid.

| (Core material) | |
|---|---|
| Styrene-acrylic resin (softening point 124° C.; Tg 62° C.) | 100 parts |
| Carbon black MA#8 (Mitsubishi Chemical Industries) | 5 parts |
| Charge regulating agent: Bontoron N-01 (Oriental Chemical Co., Ltd.) | 3 parts |

The above constituent materials were well mixed in a Henschel mixer, kneaded, pulverized after refrigeration, and finally classified after being finely powdered in a jet pulverizer to produce core material having a mean particle size of 7.9 μm.

The thus obtained core material was sprayed at a rate of 3,000 parts by weight in the aforesaid application fluid using a SPIRACOTA Sp-40 (Okada Seiko K.K.) for 100 min at a spray pressure of 4.0 kg.cm, spray rate of 55 g/min and temperature of 40° C. The obtained particles were then sieved to eliminate agglomerate particles, thereby producing a coated-type toner. Mean particle size of the obtained toner was 8.7 μm, and volume resistivity was $2\times10^{15}$ Ω.cm.

EXAMPLE 8

| (Core material) | |
|---|---|
| Styrene-acrylic resin (softening point 124° C.; Tg 62° C.) | 100 parts |
| Carbon black MA#8 (Mitsubishi Chemical Industries) | 5 parts |
| Charge control agent: Bontoron N-01 (Oriental Chemical Co., Ltd.) | 3 parts |

The above constituent materials were well mixed in a Henschel mixer, kneaded, pulverized after refrigeration, and finally classified after being finely powder in a jet pulverizer to produce core material having a mean particle size of 13 μm. Plasma-polymerized particles A were externally added to the surface of the aforesaid core material at a ratio of 0.09 parts to 100 parts by weight respectively by adequately mixing same with a Henschel mixer, thereby producing an external-additive type toner. The obtainer toner had a volume resistivity of $1\times10^{15}$ Ω.cm.

REFERENCE EXAMPLES 1 to 8

Reference Examples 1 through 8 of the developing material of the present invention were produced in the same manner as in Examples 1 through 8, with the exception that plasma-polymerized particles A through D were omitted.

Evaluation 1

The carriers of Examples 1 to 4 and Reference Examples 1 to 4 were tested and their functionality evaluated as two-component carriers. More specifically, two-component developers mixed with a reference toner hereinafter described at a toner weight ratio of 8% were used in copy functions under the conditions described hereinafter in Developing Conditions 1, and evaluated. Evaluation included reference toner charge capacity and image evaluation at the start of the copy process and after 60,000 copies. Copy image quality and developer adhesion to the surface of the photosensitive member under environmental conditions of high temperature and humidity, specifically a temperature of 35° C. and 80% humidity, were evaluated. Results of these evaluations are shown in Table 2.

| (Reference toner) | |
|---|---|
| Styrene acrylic resin (softening point 124° C.; Tg 62° C.) | 100 parts |
| Carbon black MA#8 (Mitsubishi Chemical Industries) | 5 parts |
| Charge regulating agent: Bontoron N-01 (Oriental Chemical Co., Ltd.) | 3 parts |

The above constituent materials were well mixed in a Henschel mixer, kneaded, pulverized after refrigeration, and finally classified after being finely powdered in a jet pulverizer to produce a reference toner having a mean particle size of 11.3 μm.

(Developing Conditions 1)
Photosensitive member: Se
Developing sleeve: Aluminum member, 24 mm diameter
Magnetic roller: 8 electrodes, magnetic flux density 800 gauss, 700 rpm
Brush-height regulating gap: 0.35 mm
Developing gap: 0.45 mm
Photosensitive drum rotational speed: 11 cm/s
Maximum potential of electrostatic latent image: 600 V
Developing bias potential: 200 V

Evaluation 2

The toners of Examples 5 to 8 and Reference Examples 5 to 8 were tested and their functionality evaluated as two-component toners. More specifically, two-component developers mixed with a reference carrier hereinafter described at a carrier weight ratio of 10% were used in copy functions under the conditions described hereinafter in Developing Conditions 1, and thereafter evaluated. Evaluation included reference example toner charge capacity and copy image evaluation at the start of the copy process and after 60,000 copies. Copy image quality and developer adhesion to the surface of the photosensitive member under environmental conditions of high temperature and humidity, specifically a temperature of 35° C. and 80% humidity, were evaluated. Results of these evaluations are shown in Table 3.

| (Reference carrier) | |
|---|---|
| Thermoplastic polyester resin | 100 parts |
| Magnetic powder EPT-1000 (Toda Chemical Co., Ltd.) | 500 parts |
| Carbon black MA#8 (Mitsubishi Chemical Industries) | 2 parts |

The above constituent materials were well mixed in a Henschel mixer, kneaded, pulverized after refrigeration, and finally classified after being finely powdered in a jet pulverizer to produce a reference carrier having a mean particle size of 55 μm.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

TABLE 1-A

| Plasma-polymerized particle No. | Seed particle <material> (mean size) | Production apparatus |
|---|---|---|
| A | NO | #1 |
| B | NO | #1 |
| C | NO | #2 |
| D | YES <A1203> (0.1 μm) | #3 |
| E | YES <A1203> (0.1 μm) | #4 |

| Plasma particle | Material gases (flow rate: sccm) #1 | #2 | #3 | #4 |
|---|---|---|---|---|
| A | tetrafluoro-ethylene (100) | butadiene (100) | hydrogen (300) | NA |
| B | perfluoro-propylene (200) | vanadyl ethylate (15) | helium (200) | NA |
| C | trifluoro-chloroethylene (120) | trimethyl-aluminum hydrogen solution 10% (80) | hydrogen (200) | NA |
| D | ethylene tetrafluoride (100) | styrene (60) | NA | methane tetra-fluoride (60) |
| E | perfluoro- | diborane | nitrogen | NA |

TABLE 1-A-continued

| | | | |
|---|---|---|---|
| | propylene (100) | (50) | (100) |

TABLE 1-B

| Plasma-polymerized particle No. | Plasma-polymerization conditions: Reaction pressure (torr) | Frequency (Hz) | Power (watt) | Discharge time |
|---|---|---|---|---|
| A | 1.4 | 500 k | 100 | 55 min |
| B | 1.3 | 90 k | 120 | 70 min |
| C | 1.7 | 200 k | 130 | 58 min |
| D | 0.9 | 1 M | 170 | 60 min |
| E | 0.9 | 13.56 M | 150 | 70 min |

| Plasma particle No. | Mean size (μm) | Composition: halogen | other (atomic %) | Volume resistivity (Ω · cm) |
|---|---|---|---|---|
| A | 0.08 | F:12 | H:32 | $2.5 \times 10^7$ |
| B | 0.05 | F:28 | V + 0:0.2 | $1.9 \times 10^6$ |
| C | 0.04 | F:15<br>Cl:12 | H:27<br>Al:0.8 | $7.5 \times 10^7$ |
| D | 0.19 | F:18 | H:24 | $1.1 \times 10^8$ |
| E | 0.27 | F:9.5 | H:29<br>B:0.2<br>N:3.4 | $4.2 \times 10^8$ |

TABLE 2

| Triboelectric charging characteristics: Start Charge (μc/g) | Start Image *1 | After 60,000 Charge (μc/g) | After 60,000 Image *1 | Copy image high temp/humidity *2 | Developer adhesion on photo-sensitive member |
|---|---|---|---|---|---|
| Ex-1 | | | | | |
| −12.4 | O | −12.1 | O | O | NO |
| Ex-2 | | | | | |
| −11.2 | O | −11.0 | O | O | NO |
| Ex-3 | | | | | |
| −10.9 | O | −11.0 | O | O | NO |
| Ex-4 | | | | | |
| −12.0 | O | −11.7 | O | O | NO |
| Ref Ex-1 | | | | | |
| −11.7 | O | −8.2 | X | X | YES |
| Ref Ex-2 | | | | | |
| −10.9 | O | −7.1 | X | X | YES |
| Ref Ex-3 | | | | | |
| −10.1 | O | −5.3 | X | X | YES |
| Ref Ex-4 | | | | | |
| −10.3 | O | −4.9 | X | X | YES |

*1 O: Absence of White streaks and/or spots on copy image; adequate image density
X: Presence of white streaks and/or spots on copy image; blurring
2 O: No image drift X: Image drift

TABLE 3

| Triboelectric charging characteristics: Start Charge (μc/g) | Start Image *1 | After 60,000 Charge (μc/g) | After 60,000 Image *1 | Copy image high temp/humidity *2 | Developer adhesion on photo-sensitive member |
|---|---|---|---|---|---|
| Ex-5 | | | | | |
| −13.6 | O | −13.2 | O | O | NO |
| Ex-6 | | | | | |
| −12.1 | O | −11.9 | O | O | NO |
| Ex-7 | | | | | |
| −10.8 | O | −10.4 | O | O | NO |
| Ex-8 | | | | | |
| −12.2 | O | −11.8 | O | O | NO |
| Ref Ex-5 | | | | | |
| −11.9 | O | −7.6 | X | X | YES |
| Ref Ex-6 | | | | | |
| −12.1 | O | −7.9 | X | X | YES |
| Ref Ex-7 | | | | | |
| −10.1 | O | −5.2 | X | X | YES |
| Ref Ex-8 | | | | | |
| −9.8 | O | −4.9 | X | X | YES |

*1 O: Absence of white streaks and/or spots on copy image; adequate image density
X: Presence of white streaks and/or spots on copy image; blurring
*2 O: No image drift X: Image drift

What is claimed is:

1. A developer for use in developing an electrostatic latent image comprising a core and halogenated amorphous carbon particles prepared by plasma-polymerization wherein said particles are adhered to substantially the entire surface of the core.

2. A developer for use in developing an electrostatic latent image as claimed in claim 1, wherein said halogenated amorphous carbon particles contain halogen in an amount of 2 atomic % or greater.

3. A developer for use in developing an electrostatic latent image as claimed in claim 1, wherein said halogenated amorphous carbon particles contain hydrogen in an amount of about 10 to 60 atomic %.

4. A developer for use in developing an electrostatic latent image as claimed in claim 1, wherein said halogenated amorphous carbon particles have a mean particle size of about 0.005 to 0.50 μm.

5. A developer for use in developing an electrostatic latent image as claimed in claim 1, wherein said halogenated amorphous carbon particles include seed particles with plasma-polymerized films coated thereover which contain at least carbon and halogen, said halogenated amorphous carbon particles having a mean particle size of about 0.05 to 0.50 μm.

6. A developer for use in developing an electrostatic latent image as claimed in claim 5, wherein material of said seed particles is selected from the group consisting of metallic oxide, pigment, resin, wax, and magnetic material.

7. A developer for use in developing an electrostatic latent image as claimed in claim 1, wherein said halogenated amorphous carbon particles have volume resistivity of $9.9 \times 10^9$(Ωcm) or less.

8. A carrier for use in developing an electrostatic latent image comprising a magnetic core and halogenated amorphous carbon particles prepared by plasma-polymerization wherein said particles are adhered on the surface of the core, said carrier having a mean particles size of about 20 to 90 μm.

9. A carrier for use in developing an electrostatic latent image as claimed in claim 8, wherein said magnetic core is selected from the group consisting of iron, nickel, cobalt, zinc, antimuny, aluminum, iron oxide, titanium oxide, chrome nitride, and silicon carbide.

10. A carrier for use in developing an electrostatic latent image as claimed in claim 8, wherein said magnetic core is made of binder resin and magnetic powders.

11. A carrier for use in developing an electrostatic latent image as claimed in claim 8, wherein said plasma-polymerized particles are adhered in amount of 1 to 10 parts by weight based on the amount of 100 parts by weight of the core.

12. A toner for use in developing an electrostatic latent image comprising a binder resin core and halogenated amorphous carbon particles prepared by plasma-polymerization wherein said particles are adhered to cover the surface of the core, said toner having a mean particle size of about 4 to 20 μm.

13. A toner for use in developing an electrostatic latent image as claimed in claim 12, wherein said binder resin core is selected from the group consisting of thermoplastic resin, thermoset resin, and photoset resin.

14. A toner for use in developing an electrostatic latent image as claimed in claim 12, wherein said plasma-polymerized particles are adhered in amount of 0.01 to 0.20 parts by weight based on the amount of 100 parts by weight of the core.

15. A developer for use in developing an electrostatic latent image comprising a core coated with an overcoat layer, said overcoat layer including binder resin and halogenated amorphous carbon particles prepared by plasma-polymerization with said particles uniformly dispersed in said binder resin.

16. A developer for use in developing an electrostatic latent image as claimed in claim 15, wherein said halogenated amorphous carbon particles contain halogen in an amount of 2 atomic % or greater.

17. A developer for use in developing an electrostatic latent image as claimed in claim 15, wherein said halogenated amorphous carbon particles contain hydrogen in an amount of about 10 to 60 atomic %.

18. A developer for use in developing an electrostatic latent image as claimed in claim 15, wherein said halogenated amorphous carbon particles have a mean particle size of about 0.005 to 0.50 μm.

19. A developer for use in developing an electrostatic latent image comprising binder resin and halogenated amorphous carbon particles prepared by plasma-polymerization wherein said particles are uniformly dispersed in said binder resin.

20. A developer for use in developing an electrostatic latent image as claimed in claim 19, wherein said halogenated amorphous carbon particles contain halogen in an amount of 2 atomic % or greater.

21. A developer for use in developing an electrostatic latent image as claimed in claim 19, wherein said halogenated amorphous carbon particles contain hydrogen in an amount of about 10 to 60 atomic %.

22. A developer for use in developing an electrostatic latent image as claimed in claim 19, wherein said halogenated amorphous carbon particles have a mean particle size of about 0.005 to 0.50 μm.

23. A carrier for use in developing an electrostatic latent image comprising binder resin and halogenated amorphous carbon particles prepared by plasma-polymerization, said particles are uniformly dispersed in said binder resin in amount of 1 to 10 parts by weight based on 100 parts by weight of the binder resin.

24. A toner for use in developing an electrostatic latent image comprising binder resin and halogenated amorphous carbon particles prepared by plasma-polymerization, said particles are uniformly dispersed in said binder resin in amount of 0.5 to 0.3 parts by weight based on 100 parts by weight of the binder resin.

* * * * *